United States Patent
Laffey (10) Patent No.: US 10,885,196 B2
(45) Date of Patent: Jan. 5, 2021

(54) EXECUTING PROTECTED CODE

(71) Applicant: Hewlett Packard Enterprise Development LP, Houston, TX (US)

(72) Inventor: Thomas M. Laffey, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 202 days.

(21) Appl. No.: 16/061,814

(22) PCT Filed: Apr. 29, 2016

(86) PCT No.: PCT/US2016/030031
§ 371 (c)(1),
(2) Date: Jun. 13, 2018

(87) PCT Pub. No.: WO2017/188976
PCT Pub. Date: Nov. 2, 2017

(65) Prior Publication Data
US 2019/0005245 A1     Jan. 3, 2019

(51) Int. Cl.
*G06F 21/57*     (2013.01)
*G06F 3/06*     (2006.01)

(52) U.S. Cl.
CPC .......... *G06F 21/575* (2013.01); *G06F 3/0619* (2013.01); *G06F 3/0632* (2013.01); *G06F 3/0679* (2013.01); *G06F 21/577* (2013.01)

(58) Field of Classification Search
CPC .... G06F 21/575; G06F 21/577; G06F 3/0679; G06F 3/0632; G06F 3/0619
See application file for complete search history.

(56) References Cited

U.S. PATENT DOCUMENTS

| | | | | |
|---|---|---|---|---|
| 5,421,006 A | * | 5/1995 | Jablon | G06F 21/565 713/187 |
| 6,678,833 B1 | * | 1/2004 | Grawrock | G06F 9/4401 713/1 |

(Continued)

FOREIGN PATENT DOCUMENTS

| WO | WO-2014175863 A1 * | 10/2014 | .......... G06F 3/0632 |
|---|---|---|---|
| WO | WO-2015016867 A1 * | 2/2015 | ............. G06F 8/654 |

OTHER PUBLICATIONS

Andrew Regenscheid, "BIOS Protection Guidelines for Servers", Special Publication 800-147B (Draft), Jul. 2012, 31 pages.
(Continued)

*Primary Examiner* — Joseph P Hirl
*Assistant Examiner* — Thomas A Gyorfi
(74) *Attorney, Agent, or Firm* — Trop, Pruner & Hu, P.C.

(57) ABSTRACT

In some examples, in response to a reset of an electronic device, a method disables hardware write locking of a first region in a non-volatile memory, and executes a first boot code portion from the first region to begin a boot procedure. The executed first boot code portion checks whether an update code for the first boot code portion exists. In response to determining that no update code for the first boot code portion exists, the executed first boot code portion causes hardware write locking of the first region. After causing the hardware write locking of the first region, the boot procedure continues, the boot procedure comprising verifying an integrity of a second boot code portion.

20 Claims, 6 Drawing Sheets

(56) References Cited

U.S. PATENT DOCUMENTS

| | | | |
|---|---|---|---|
| 7,058,779 B1 | 6/2006 | Mcclain | |
| 7,756,834 B2 | 7/2010 | Masters et al. | |
| 7,784,098 B1 | 8/2010 | Fan et al. | |
| 8,495,019 B2 | 7/2013 | Shisheng et al. | |
| 10,089,472 B2 * | 10/2018 | Jeansonne | G06F 21/572 |
| 2002/0144104 A1 * | 10/2002 | Springfield | G06F 9/4406 |
| | | | 713/2 |
| 2006/0112266 A1 | 5/2006 | Little et al. | |
| 2007/0006304 A1 | 1/2007 | Kramer et al. | |
| 2009/0276617 A1 * | 11/2009 | Grell | G06F 21/575 |
| | | | 713/2 |
| 2011/0087872 A1 * | 4/2011 | Shah | H04L 9/3236 |
| | | | 713/2 |
| 2011/0296409 A1 * | 12/2011 | Lo | G06F 8/71 |
| | | | 718/1 |
| 2012/0167218 A1 | 6/2012 | Poornachandran et al. | |
| 2012/0297057 A1 * | 11/2012 | Ghosh | G06F 21/575 |
| | | | 709/224 |
| 2014/0082257 A1 | 3/2014 | Scouller et al. | |
| 2015/0371046 A1 * | 12/2015 | Chen | G06F 21/575 |
| | | | 713/2 |
| 2016/0055068 A1 | 2/2016 | Jeansonne | |
| 2016/0055338 A1 | 2/2016 | Jeansonne et al. | |
| 2016/0085558 A1 | 3/2016 | Anbazhagan et al. | |

OTHER PUBLICATIONS

Butterworth et al., "BIOS Chronomancy:Fixing the Core Root of Trust for Measurement", CCS'13, Nov. 4-8, 2013, 13 pages.

Cooper et al., "BIOS Protection Guidelines", Special Publication 800-147, Apr. 2011, 26 pages.

Kovah, et al., "New Results for Timing-Based Attestation" IEEE Symposium on Security and Privacy, 2012, pp. 239-253.

Regenscheid et al., "BIOS Integrity Measurement Guidelines (Draft)", Special Publication 800-155, Dec. 2011, 47 pages.

TCG Published, "TCG Attestation PTS Protocol: Binding to TNC IF-M", Specification Version 1.0, Revision 28, Aug. 24, 2011, pp. 1-107.

Trusted Computing Group, "TCG Attestation PTS Protocol: Binding to TNC IF-M", available online at <https://trustedcomputinggroup.org/resource/tcg-attestation-pts-protocol-binding-to-tnc-if-m/>, Specification, Jan. 9, 2011, 4 pages.

Trusted Computing Group, Inc., "TCG EFI Platform Specification", Version 1.20, Final Revision 1.0, For TPM Family 1.1 or 1.2, Jul. 7, 2006, pp. 1-37.

Dhilung Kirat et al., "Barebox: Efficient Malware Analysis on Bare-metal," ACSAC'11, Dec. 5-9, 2011, Orlando, Florida, USA, pp. 1-10, ACM.

International Searching Authority, The International Search Report and the Written Opinion, dated Jan. 16, 2017, PCT/US2016/030031, 10 Pgs.

* cited by examiner

EXECUTING PROTECTED CODE

BACKGROUND

An electronic device can include code to perform various tasks of the electronic device. Such code can include boot code to start up the electronic device, an operating system, and applications. The code in an electronic device can be subject to attack such that an unauthorized entity can gain access to the electronic device, or can introduce malicious code to cause damage to or to obtain information of the electronic device.

BRIEF DESCRIPTION OF THE DRAWINGS

Some implementations are described with respect to the following figures.

DETAILED DESCRIPTION

Examples of electronic devices can include any or some combination of the following: a communication device (e.g., a switch, a router, a gateway, etc.), a server computer, a storage system, a desktop computer, a notebook computer, a tablet computer, a smart phone, a game appliance, a wearable device (e.g., a smart watch, smart eyeglasses, etc.), a vehicle (or an electronic device in the vehicle), a monitor device, and so forth. An electronic device can execute various code (in the form of machine-readable instructions) to perform respective tasks of the electronic device. Examples of such code include boot code (which performs tasks associated with starting up the electronic device), an operating system (which manages hardware and other resources of the electronic device and provides services to programs executing in the electronic device), applications that run within the environment of an operating system, and/or other code.

Startup tasks performed by the boot code for starting up an electronic device can include initialization of hardware components of the electronic device, and loading of the operating system to execute in the electronic device. The boot code can check hardware components to ensure that the hardware components are present and functioning properly. The boot code can also perform other tasks, including providing security mechanisms to protect against an attack, such as to protect content from unauthorized modification, providing cryptographic services, and so forth. Examples of boot code include a Basic Input/Output System (BIOS) code, a Unified Extensible Firmware Interface (UEFI) code, or another type of boot code.

Generally, the boot code executes prior to the loading of an operating system into an electronic device. In fact, the boot code is what controls the loading of the operating system. Note, however, that there may be portions of the boot code that can execute after the operating system has been loaded.

An electronic device can be attacked in one of two general ways. A first type of attack involves an attack by malicious code (in the form of machine-readable instructions). The malicious code can be introduced into the electronic device in one of several ways. For example, the malicious code can be downloaded to the electronic device from a network, or the malicious code can be introduced into the system from a storage device.

A second type of attack involves a physical attack, where an attacker (e.g., a user) can physically alter the electronic device to induce malicious behavior, such as by replacing a memory with new memory that contains unauthorized content (such as malicious code), adding an electronic component to the electronic device to cause unauthorized behavior, and so forth.

In accordance with some implementations of the present disclosure, protection mechanisms or techniques are provided to protect against attacks on the code of the electronic device, including lower level code such as the boot code as well as higher level code such as the operating system or an application. In some examples, the protection mechanisms or techniques can involve use of trusted boot code, hardware write locking of regions in a non-volatile memory (where the regions can be used to store different code portions), and update writeable regions in which update code for updating code portions can be stored.

"Trusted boot code" can refer to boot code that is provided by a trusted entity (or multiple trusted entities) and thus can be relied upon to not have been modified by any unauthorized entity. For example, the trusted boot code can be written by the manufacturer (or a trusted supplier of the manufacturer) of an electronic device in which the trusted boot code is to be executed.

In addition, according to some implementations, by providing redundant versions of code, including boot code as well as higher level code, corrupted code can be replaced with a non-corrupted version of the code to provide a self-recovery technique that allows the electronic device to recover from corrupted code.

In alternative examples, wherein the boot code includes portions that cannot be trusted, the protection mechanisms or techniques can employ a first memory region to store boot code that is accessible by a device processor, a second memory region to store boot code that is inaccessible by the device processor, and a boot controller that is able to maintain the device processor in reset while the boot code in the first memory region is validated and replaced with the boot code in the second memory region if found to be invalid. This provides an alternative self-recovery technique.

Figure 1:
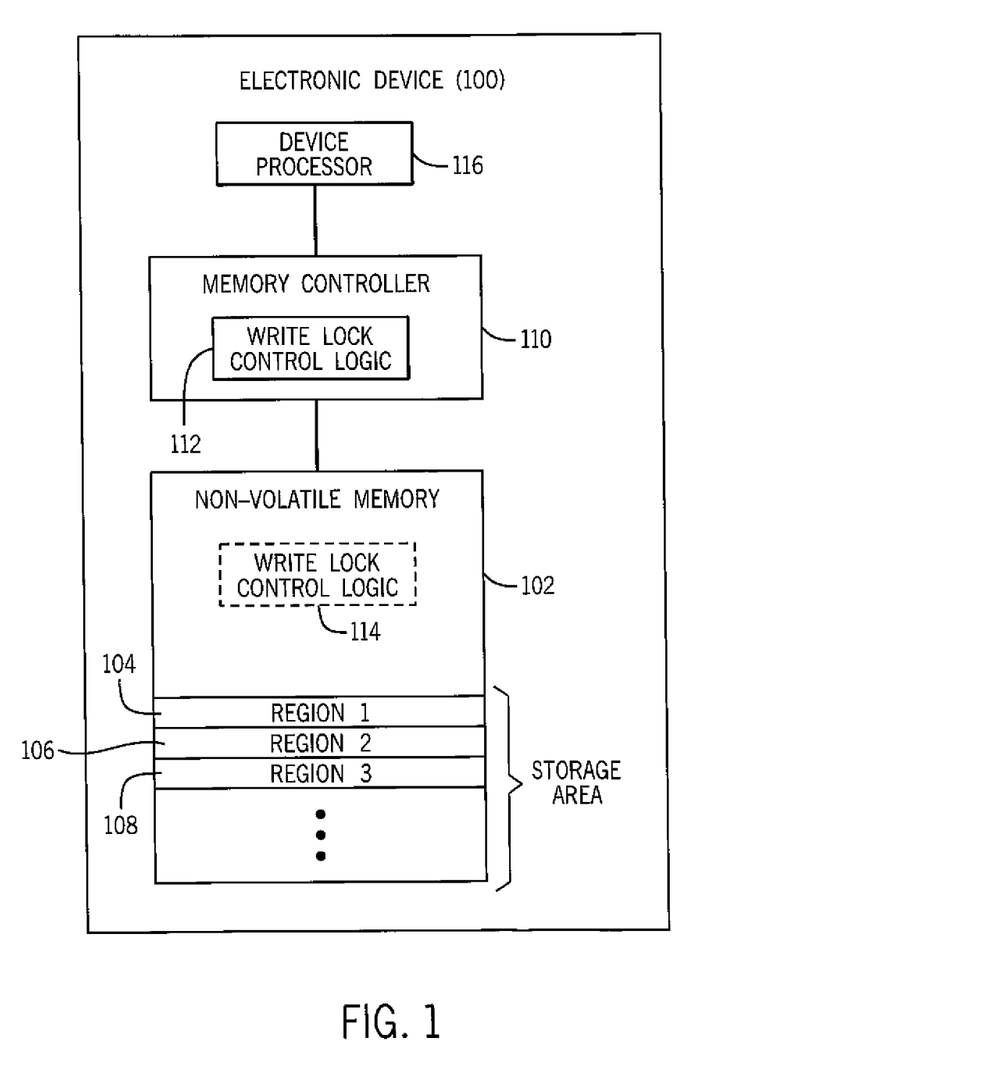
FIG. 1 is a block diagram of an example electronic device according to some examples.

FIG. 1 is a block diagram of an example electronic device 100, which includes a non-volatile memory 102 that includes multiple regions for storing different portions of code of the electronic device 100. In some examples, the non-volatile memory 102 can include a flash memory device (or multiple flash memory devices). In other examples, the non-volatile memory can be implemented with different types of memory devices that do not lose their content when power is removed from the electronic device 100, such as memristor device(s), spin torque memory device(s), phase change memory device(s), and so forth.

The multiple regions (which collectively make up a storage area) of the non-volatile memory 102 include a first region 104 to store a first portion of a boot code in the electronic device 100 (this first portion is referred to as a "first boot code portion"); a second region 106 to store a second portion of the boot code (referred to as the "second boot code portion"); a third region 108 to store product code, such as an operating system and/or application(s). Although just three regions are shown in FIG. 1, it is noted that in other examples, additional regions can be defined in the non-volatile memory 102 to store other information, such as configuration data that relates to a configuration of the electronic device 100. As examples, the configuration data can specify an operational feature (or features) of the electronic device 100. For example, if the electronic device 100 is a communication switch or router, then the configuration data can specify how ports are partitioned for use with respective different virtual local area networks (VLANs). Other types of configuration data can be used in other examples.

Although two regions 104 and 106 are depicted as storing respective first and second boot code portions, it is noted that the non-volatile memory 102 can be divided into more regions for storing greater than two portions of the boot code. In yet further examples, instead of storing multiple portions of the boot code in respective different regions of the non-volatile memory 102, the entirety of the boot code can be stored in just one region in the non-volatile memory 102.

The electronic device 100 further includes a memory controller 110 that manages access of the non-volatile memory 102. The memory controller 110 can be implemented with a hardware processing circuit, which can be in the form of a microcontroller, a microprocessor, a core (or cores) of a multi-core microprocessor, a programmable integrated circuit, a programmable gate array, and so forth. In further examples, the memory controller 110 can be implemented with a combination of machine-readable instructions and a hardware processing circuit.

The memory controller 110 can receive a memory access request (e.g., read request to read data or write request to write data) from a requester in the electronic device 100, where the requester can include a device processor 116, an input/output (I/O) device, or other type of device that is able to access the non-volatile memory 102. The memory controller 110 receives the memory access request and issues, to the non-volatile memory 102, a memory command (or multiple memory commands) to perform the requested access operation.

Although the memory controller 110 is depicted as being separate from the non-volatile memory 102, it is noted that in other examples, the memory controller 110 can be part of the non-volatile memory 102.

In some examples, the memory controller 110 includes a write lock control logic 112 that can selectively control write locking of the respective regions 104, 106, and 108 of the non-volatile memory 102. The write lock control logic 112 can be implemented with a portion of the hardware processing circuit of the memory controller 110, or can be implemented with machine-readable instructions executed by the memory controller 110.

Write locking a region of the non-volatile memory 102 refers to preventing or disabling a write to the region of the non-volatile memory 102. Disabling the write locking of the region of the non-volatile memory 102 refers to enabling a write to the region. Since the write lock control logic 112 is part of the memory controller 110, the write locking provided by the write lock control logic 112 is referred to as hardware write locking.

In alternative examples, instead of enabling or disabling write locking of the regions 104, 106, and 108 of the non-volatile memory 102 using the write lock control logic 112 in the memory controller 110, a write lock control logic 114 can be provided in the non-volatile memory 102, to selectively provide hardware write locking of the regions 104, 106, and 108.

In some examples, the write lock control logic 112 or 114 can be implemented as a register (or registers) containing respective indicators (e.g., bits) for the respective regions 104, 106, and 108. If a respective indicator in the register(s) is set to a first value, then hardware write locking of the respective non-volatile memory region is enabled. On the other hand, if the respective indicator in the register(s) is set to a second, different value, then hardware write locking of the respective non-volatile memory region is disabled. In other examples, the write lock control logic 112 or 14 can be implemented with other types of circuitry.

The device processor 116 is the main processor of the electronic device 100, which executes various code of the electronic device 100, including the boot code, operating system, and application(s), as examples. The device processor 116 can be implemented as a microprocessor, a core (or cores) of a multi-core microprocessor, a microcontroller, a programmable integrated circuit device, a programmable gate array, or any other hardware processing circuit.

In some examples, the various code portions in the regions 104, 106, and 108 of the non-volatile memory 102 are executable by the device processor 116.

Figure 2:
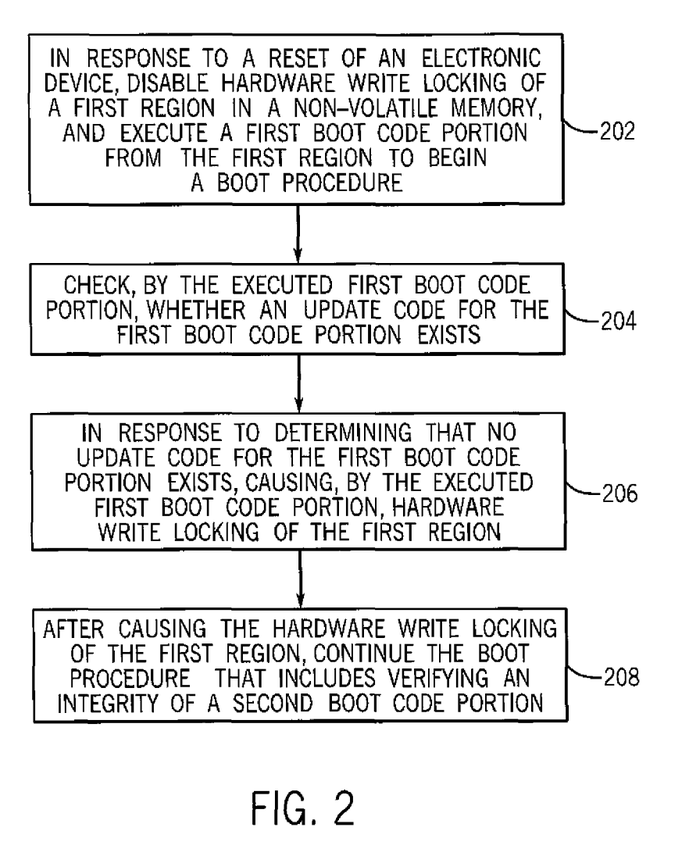
FIG. 2 is a flow diagram of a process according to some examples.

FIG. 2 is a flow diagram of an example process of executing protected code in the electronic device 100 according to some implementations. Executing protected code can refer to executing code in a manner that prevents the electronic device from being subjected to an attack by an unauthorized entity, either in the form of malware or a physical attack.

In response to a reset of the electronic device 100, the process of FIG. 2 disables (at 202) hardware write locking (as provided by the write lock control logic 112 or write lock control logic 114 of FIG. 1) of a first region (e.g., 104) in a non-volatile memory (e.g., 102 in FIG. 1). More specifically, task 202 can include disabling hardware write locking of multiple regions (e.g., 104, 106, and 108) in the non-volatile memory 102. Disabling the hardware write locking of the first region (and possibly other regions) of the non-volatile memory 102 includes the write lock control logic 112 or 114 setting respective indicator(s) to a value to disable the hardware write locking. In response to the reset, the process further executes (at 202) a first boot code portion from the first region (e.g. 104 in FIG. 1) of the non-volatile memory 102 to being a boot procedure.

A reset of an electronic device 100 can refer to a reset that is caused by activation of a hardware component, such as a power button, a keystroke combination on a keyboard, or other hardware component, to indicate that a restart of the electronic device 100 is requested. A reset of the electronic device 100 can also be initiated by code executed in the electronic device 100.

A restart of the electronic device 100 can involve powering off at least some portion of the components of the electronic device 100, followed by re-applying power to such portion of the components to begin operation of the electronic device 100. The reset of the electronic device 100 causes the write lock control logic 112 or 114 to remove the hardware write locking of the regions 104, 106, and 108.

The process of FIG. 2 further includes checking (at 204), by the executed first boot code portion, whether an update code for the first boot code portion exists. "Update code" can refer to machine-readable instructions that are provided to replace or modify at least a portion (or the entirety) of a respective code portion, in this case the first boot code portion. In response to determining that no update code for the first boot code portion exists, the process of FIG. 2 further includes causing (at 206), by the executed first boot code portion, hardware write locking of the first region of the non-volatile memory 102. For example, the first boot code portion can program the write lock control logic 112 or 114 to enable the hardware write locking of the first region.

After causing the hardware write locking of the first region of the non-volatile memory 102, the process continues (at 208) with the remainder of the boot operation, where the boot procedure includes verifying an integrity of a second boot code portion, such as that in the second region 106 of the non-volatile memory 102.

Verifying an integrity of a code portion can refer to checking that the code portion has not been modified in any way, or that the code portion is from an authorized source. In some examples, verifying the integrity of the code portion can be based on a digital signature of the code portion. The digital signature can be produced by hashing the code portion to produce a hash value, and encrypting the hash value using a private key to produce an encrypted value. The encrypted value, along with other information, can form the digital signature of the code portion. An accessing entity that accesses the code portion can decrypt the digital signature using a public key to retrieve a hash value, which can be compared with a hash value generated by the accessing entity from the code portion at the time of accessing the code portion. If the hash values match, then the integrity of the code portion is verified.

Figure 3:
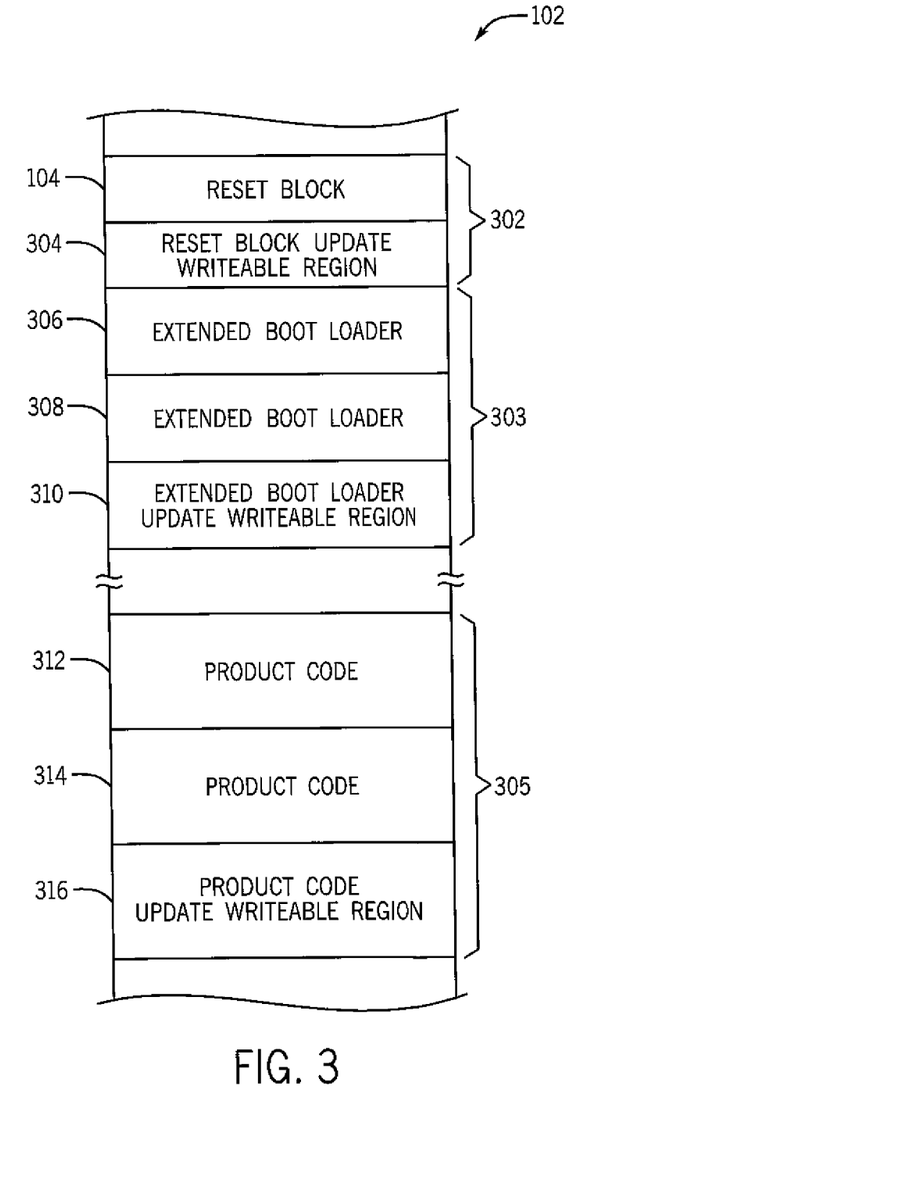
FIG. 3 illustrates regions in a non-volatile memory according to some examples.

FIG. 3 shows regions of the non-volatile memory 102 according to further implementations. The non-volatile memory 102 includes a reset block segment 302, an extended boot loader segment 303, and a product code segment 305. The reset block segment 302 includes the first region 104 that stores the first boot code portion, and an update writeable region 304 to store update code for the first boot code portion. In examples according to FIG. 3, the first boot code portion is a reset block of the boot code. In some examples, the reset block can include an initial boot loader and a core root of trust. The initial boot loader can also be referred to as a boot block, and is the initial portion of the boot code that is considered to be trustworthy and that is executed first before the rest of the boot code is allowed to execute on the device processor 116 in the electronic device 100. The initial boot loader can be used to check the integrity of the boot code as well as to perform other initial functions. The core root of trust code can refer to another part of the boot code that is to provide various protections of the boot code, including protecting content from unauthorized modification, performing cryptographic operations including verifying digital signatures of updates of portions of the boot code, and other tasks.

The update writeable region 304 can be used to store the update code for the reset block in the region 104. If it is desired to update the reset block, the update code for the reset block is written to the update writeable region 304. During a boot procedure, the reset block in the region 104 can be replaced with the update code in the update writeable region 304.

The extended boot loader segment 303 includes redundant regions 306 and 308 and an update writeable region 310. In some examples, each region 306 or 308 stores a respective version of the second boot code portion. In some examples, the second boot code portion includes an extended boot loader, which is the portion of the boot code that follows the initial boot loader. Generally, the extended boot loader can perform initialization of hardware components of the electronic device 100 and the loading of the operating system of the electronic device 100. The redundant regions 306 and 308 are to store redundant versions of the extended boot loader. Collectively, the redundant regions 306 and 308 can correspond to the second region 106 shown in FIG. 1.

Generally, the versions of the extended boot loader stored in the extended boot loader redundant regions 306 and 308 are the same. However, due to an update or another cause (such as corruption due to malware or another source), one of the versions of the extended boot loader in one of the regions 306 and 308 can become different form the other version of the extended boot loader in the other region 306 or 308.

The update writeable region 310 in the extended boot loader segment 303 is used to store update code for the extended boot loader. If it is desired to update the extended boot loader, the update code for the extended boot loader is written to the update writeable region 310. During a boot procedure, the extended boot loader in the region 306 or 308 can be replaced with the update code in the update writeable region 310.

The product code segment 305 includes product code redundant regions 312 and 314 and an update writeable region 316. Each of the redundant regions 312 and 314 is to store a version of the product code that is to execute in the electronic device 100. The product code can include the operating system, application(s), and so forth. Collectively, the redundant regions 312 and 314 can correspond to the third region 108 shown in FIG. 1.

The redundant regions 312 and 314 usually store the same version of the product code. However, due to an update, or due to a different cause, one of the versions of the product code in the region 312 or 314 can become different from the version of the device code in the other of the regions 312 and 314.

Update code for the product code 316 can be stored in the update writeable region 316, for use in updating the product code in the region 312 or 314 during a boot procedure.

Although not shown in FIG. 3, another region of the non-volatile memory 102 can include similar regions for storing configuration data, including multiple redundant regions to store redundant versions of the configuration data, as well as an update writeable region to store update configuration data.

In some examples, the update writeable regions 304, 310, and 316 are writeable during both a boot procedure and normal operating procedure (after the operating system has been loaded) of the electronic device 100.

Figure 4A:
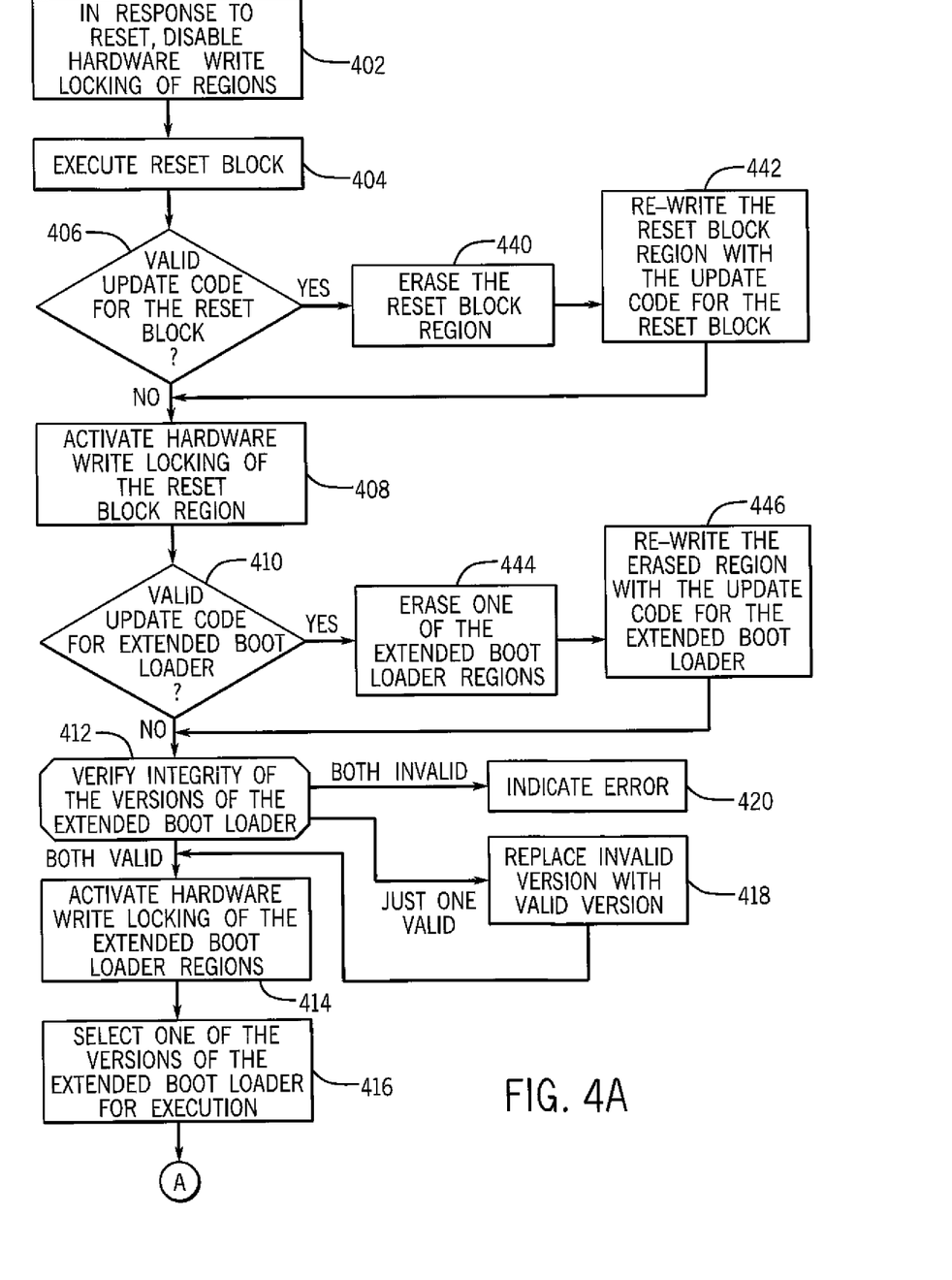
FIGS. 4A-4B are a flow diagram of a process according to further examples.
Figure 4B:
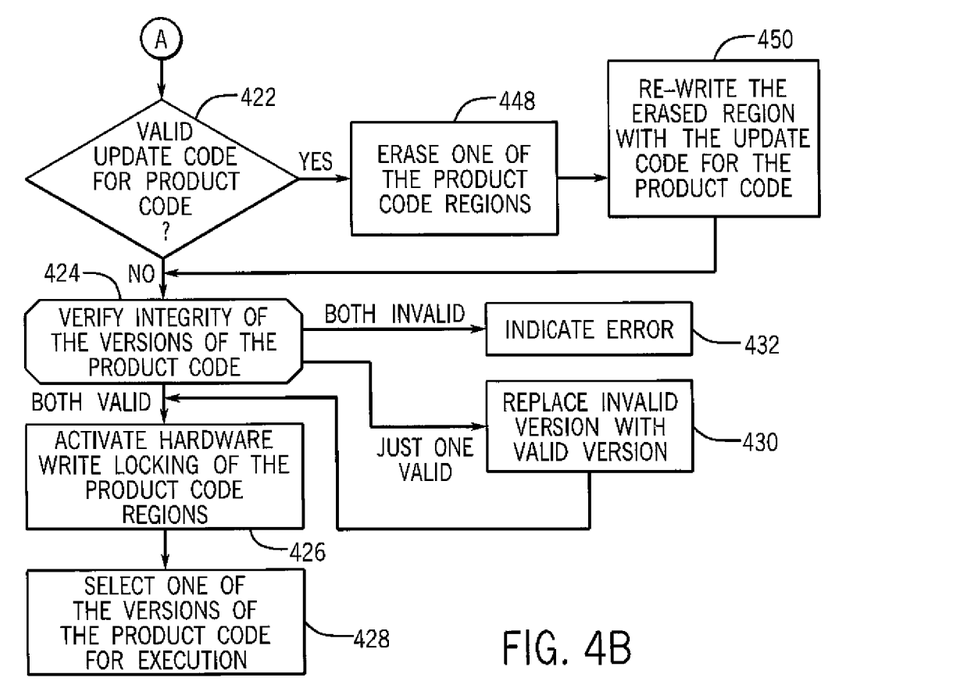

FIGS. 4A-4B depict a flow diagram of a process of booting the electronic device 100 according to further examples. The process of FIG. 4 refers to the regions of the non-volatile memory 102 depicted in FIG. 3. In response to a reset of the electronic device 100, hardware write locking of the regions 104, 306, 308, 312, and 314 in the non-volatile memory 102 is disabled (at 402). The reset block is executed (at 404) from the region 302 of the first region 102.

The executed reset block determines (at 406) whether there is a valid update code for the reset block in the update writeable region 304 of the first region 104. The determination of whether there is a valid update code in the update writeable region 304 can be based on checking if an update code has been written to the update writeable region 304, and checking a digital signature of such update code in the update writeable region 304 is valid.

If there is no valid update code in the update writeable region 304 (i.e., an update code has not been written to the update writeable region 304 or the update code that has been written is not valid), the executed reset block causes (at 408) the write lock control logic 112 or 114 to activate hardware write locking of the region 104 that stores the reset block.

The executed reset block then checks (at 410) whether there is a valid update code for the extended boot loader in the update writeable region 310. If not, the reset block verifies (at 412) the integrity of the versions of the extended boot loader in the regions 306 and 308. If the integrity of both versions of the extended boot loader in the regions 306 and 308 is verified (i.e., both versions of the extended boot loader are valid), the executed reset block causes (at 414) the write lock control logic 112 or 114 to activate hardware write locking of the regions 306 and 308, and selects (at 416) one of the versions of the extended boot loader (e.g., at random or using another criterion) for execution.

If one of the versions of the extended boot loader in the regions 306 and 308 is valid but the other version of the extended boot loader is not valid, then the executed reset block replaces (at 418) the invalid version of the extended boot loader in one of the regions 306 and 308 with the valid version of the extended boot loader in the other one of the regions 306 and 308. The process then continues to task 414.

However, if both versions of the extended boot loader in the regions 306 and 308 are invalid, then the executed reset block indicates (at 420) an error condition, and the boot procedure is not allowed to continue.

Assuming that a version of the extended boot loader is executed, the executed reset block, the executed extended boot loader checks (at 422) whether there is a valid update code for the product code in the update writeable region 316. If there is no valid update code for the product code in the update writeable region 316, the executed extended boot loader verifies (at 424) the integrity of the versions of the product code in the regions 312 and 314.

If the integrity of both versions of the product code in the regions 312 and 314 is verified (i.e., both versions of the extended boot loader are valid), the executed extended boot loader causes (at 426) the write lock control logic 112 or 114 to activate hardware write locking of the regions 312 and 314, and selects (at 428) one of the versions of the product code (e.g., at random or using another criterion) for execution, which causes loading of the operating system and application(s).

If one of the versions of the product code in the regions 312 and 314 is valid but the other version of the product code is not valid, then the executed extended boot loader replaces (at 430) the invalid version of the product code in one of the regions 312 and 314 with the valid version of the extended boot loader in the other one of the regions 312 and 314.

However, if both versions of the product code in the regions 312 and 314 are invalid, then the executed extended boot loader indicates (at 432) an error condition, and the boot procedure is not allowed to continue.

The code update process is discussed below.

As noted above, tasks 406, 410, and 422 check for presence of respective valid update codes in respective update writeable regions 304, 310, and 316. Checking for the validity of an update code involves confirming that the digital signature of the respective update code is valid. In some examples, the checking of the validity of an update code in a respective update writeable region is performed by the same code that wrote the update code to the respective update writeable region.

If the executed reset block determines (at 406) that there is a valid update code in the update writeable region 304 of the reset block segment 304, the executed reset block erases (at 440) the region 104 that stores the reset block, and re-writes (at 442) the region 104 with the update code in the update writeable region 304. The process then continues to task 408.

If the executed reset block determines (at 410) that there is a valid update code in the update writeable region 310 of the extended boot loader segment 303, the executed reset block erases (at 444) one of the regions 306 and 308 that store the versions of the extended boot loader, and re-writes (at 446) the erased region 306 or 308 with the update code in the update writeable region 310. The process then continues to task 412.

If the executed extended boot loader determines (at 422) that there is a valid update code in the update writeable region 316 of the product code segment 305, the executed extended boot loader erases (at 448) one of the regions 312 and 314 that store the versions of the product code, and re-writes (at 450) the erased region 312 or 314 with the update code in the update writeable region 316. The process then continues to task 324.

Although not shown in FIGS. 4A-4B, prior to updating the product code in the region 312 or 314 with the update code for the product code, a reset of the electronic device 100 may first be performed.

Figure 5:
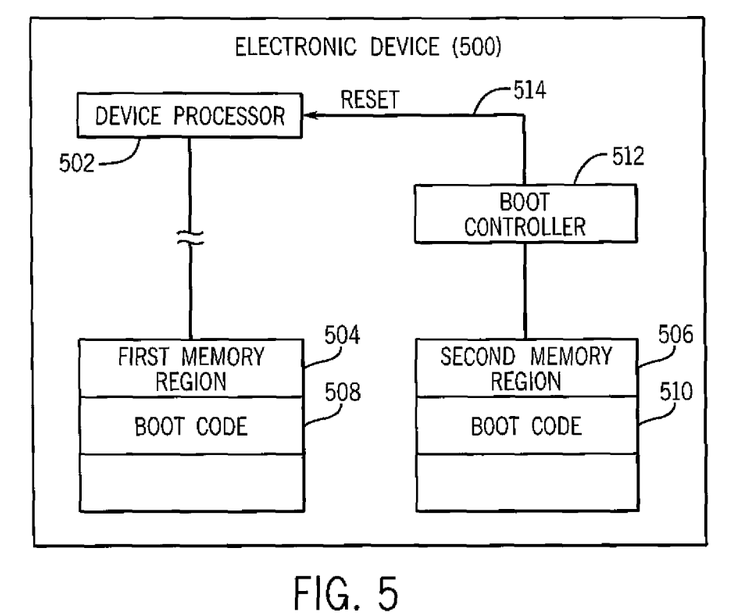
FIG. 5 is a block diagram of the electronic device according to further examples.

FIG. 5 is a block diagram of an electronic device 500 according to further implementations. The electronic device 500 includes a processor 502, and first and second memory regions 504 and 506. The first and second memory regions 504 and 506 can be part of different memory devices, or they can be part of the same memory device (or part of the same collection of memory devices). The second memory region 506 can be stored in a non-volatile memory device. The first memory region 504 can be part of a non-volatile memory device or a volatile memory device such as a dynamic random access memory (DRAM) or static random access memory (SRAM).

The first memory region 504 is to store boot code 508 that is accessible by the device processor 502, while the second memory region 506 is to store boot code 510 that is inaccessible by the device processor 502 but is accessible by a boot controller 512. Note that the boot code 508 in the first memory region 504 is also accessible by the boot controller 512.

The first memory region 504 is part of the address space of the device processor 502. The address space of the device processor 502 includes addresses that can be accessed by the device processor 502. The second memory region 506 has an address space that is outside the address space of the device processor 502.

In some examples, the first memory region 504 and the second memory region 506 can be partitioned into regions as depicted in FIG. 1 or 3.

The boot controller 512 can be implemented as a hardware processing circuit or as a combination of machine-readable instructions and a hardware processing circuit. The boot controller 512 outputs a reset signal 514 to the device processor 502. During booting of the electronic device 500, the boot controller 512 activates the reset signal 514 that is provided to the device processor 502. When the reset signal 514 is activated, the device processor 502 is maintained in reset. When the reset signal 514 is deactivated, the device processor 502 is allowed to execute machine-readable instructions.

Maintaining the device processor 502 in reset can refer to the device processor 502 being unable to maintain a state in which the device processor 502 is unable to execute machine-readable instructions (in other words, the device processor 502 is inactive).

During the booting of the electronic device 500, the boot controller 512 can perform the following additional tasks. The boot controller 512 can verify an integrity of the boot code 508 in the first memory region 504, and can update the boot code 508 in the first memory region 504 with the boot code 510 in the second memory region 506 in response to the verifying indicating that the boot code 508 in the first memory region 504 is invalid. In response to verifying the integrity of the boot code 508 in the first memory region 504, the boot controller 512 deactivates the reset signal 514 to allow the device processor 502 to execute the boot code 508 in the first memory region 504.

In response to verifying the integrity of the boot code in the first memory region 504 and determining that a version of the boot code 508 in the first memory region 504 is more up-to-date than a version of the boot code 510 in the second memory region 506, the boot controller 512 updates the boot code 510 in the second memory region 506 with the boot code 508 in the first memory region 504.

Figure 6:
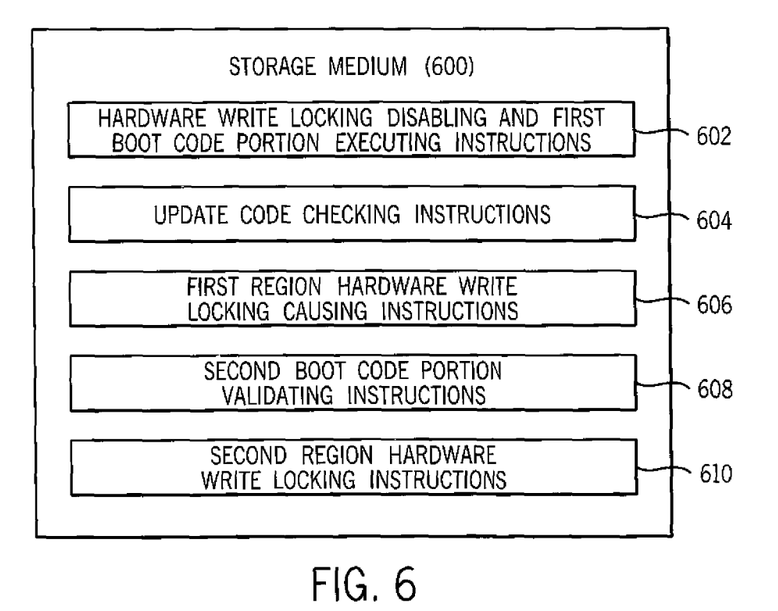
FIG. 6 is a block diagram of a storage medium storing machine-readable instructions according to some examples.

FIG. 6 shows a non-transitory machine-readable storage medium 600 that stores various machine-readable instructions that are executable on a device processor. The machine-readable instructions include instructions 602 to, in response to a reset of the electronic device, disable hardware write locking of a plurality of regions in a non-volatile memory, and execute a first boot code portion from a first region of the plurality of regions to begin a boot procedure.

The machine-readable instructions further include instructions 604 to check, by the executed first boot code portion, whether an update code for the first boot code portion exists.

The machine-readable instructions further include instructions 606 to, in response to determining that no update code for the first boot code portion exists, cause, by the executed first boot code portion, hardware write locking of the first region.

The machine-readable instructions further include instructions 608 to, after causing the hardware write locking of the first region, validate, by the first code boot portion, a second boot code portion in a second memory region of the plurality of memory regions.

The machine-readable instructions further include instructions 610 to, in response to validating the second boot code portion, cause hardware write locking of the second region and execute the second boot code portion.

The storage medium 600 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of executing protected code, comprising:
   in response to a reset of an electronic device, disabling hardware write locking of a first, second, and third region in a non-volatile memory, and executing a first boot code portion from the first region to begin a boot procedure;
   checking, by the executed first boot code portion, whether an update code for the first boot code portion exists;
   in response to determining that no update code for the first boot code portion exists, causing, by the executed first boot code portion, hardware write locking of the first region;
   after causing the hardware write locking of the first region, validating, by the first boot code portion, a second boot code portion in the second region and validating a redundant version of the second boot code portion in the third region; and
   in response to validating the second boot code portion and the redundant version of the second boot code portion:
      causing hardware write locking of the second region and the third region;
      selecting randomly the second boot code portion or the redundant version of the second boot code portion; and
      executing the randomly selected second boot code portion or redundant version of the second boot code portion.

2. The method of claim 1, wherein the first boot code portion is executed on a device processor in the electronic device.

3. The method of claim 1, wherein the hardware write locking of the first region is performed by a controller of the non-volatile memory or by logic in the non-volatile memory.

4. The method of claim 1, further comprising:
   in response to determining that the update code for the first boot code portion exists, updating, by the executed first boot code portion using the update code, the first boot code portion in the first region.

5. The method of claim 4, further comprising storing the update code in an update writeable region of the non-volatile memory, wherein the updating comprises writing the update code stored in the update writeable region to the first region.

6. The method of claim 1, further comprising:
   verifying, by the executed first boot code portion, an integrity of the second boot code portion in the second region; and
   in response to verifying the integrity of the second boot code portion, causing, by the executed first boot code portion, hardware write locking of the second region and continuing the boot procedure by executing the second boot code portion.

7. The method of claim 6, further comprising:
checking, by the executed first boot code portion, whether a further update code for the second boot code portion exists in a update writeable region for the second boot code portion;
in response to determining that the further update code exists in the update writeable region for the second boot code portion, updating, by the executed first boot code portion using the further update code, the second boot code portion in the second region.

8. The method of claim 7, wherein the third region of the non-volatile memory comprises a redundant region of the non-volatile memory which stores the redundant version of the second boot code portion, the method further comprising:
checking an integrity of the redundant version of the second boot code portion in the redundant region; and
in response to detecting an invalid second boot code portion in one of the second region and the redundant region, replacing the invalid second boot code portion with a valid second boot code portion in another one of the second region and the redundant region.

9. The method of claim 8, further comprising:
in response to detecting that both the second boot code portion in the second region and redundant version of the second boot code portion of the redundant region are invalid, indicating an error.

10. An electronic device to execute protected code, comprising:
a processor;
a first memory region to store boot code accessible by the processor;
a boot controller; and
a second and a third memory region to store a second boot code and a third boot code that are inaccessible by the processor but that are accessible by the boot controller, wherein the third boot code is a redundant version of the second boot code, the boot controller to, during booting of the electronic device:
activate a reset signal to the processor to maintain the processor in reset,
determine an integrity of the boot code in the first memory region,
in response to the determining indicating that the boot code in the first memory region is invalid:
validate the second boot code in the second memory region and validate the third boot code in the third memory region;
cause hardware write locking of the second memory region and the third memory region;
select randomly the second boot code or the third boot code; and
execute the randomly selected second boot code or third boot code; and
in response to verifying the integrity of the boot code in the first memory region, deactivate the reset signal to allow the processor to execute the boot code in the first memory region.

11. The electronic device of claim 10, wherein the determining of the integrity of the boot code in the first memory region comprises determining that a signature of the boot code in the first memory region is valid.

12. The electronic device of claim 10, wherein the boot controller is to further:
in response to verifying the integrity of the boot code in the first memory region and determining that a version of the boot code in the first memory region is more up-to-date than a version of the boot code in the second memory region, update the boot code in the second memory region with the boot code in the first memory region.

13. The electronic device of claim 10, wherein the second memory region is outside an address space of the processor, and the first memory region is part of the address space of the processor.

14. The electronic device of claim 10, wherein the third memory region of the non-volatile memory comprises a redundant region of the non-volatile memory which stores the third boot code which is a redundant version of the second boot code portion, wherein the boot controller is to further:
check an integrity of the redundant version of the second boot code in the redundant region; and
in response to detecting an invalid second boot code in one of the second region and the redundant region, replace the invalid second boot code with a valid second boot code in another one of the second region and the redundant region.

15. The electronic device of claim 10, wherein the boot controller is to further:
in response to detecting that both the second boot code in the second region and redundant version of the second boot code of the redundant region are invalid, indicate an error.

16. A non-transitory machine-readable storage medium storing instructions to execute protected code, the instructions upon execution causing an electronic device to:
in response to a reset of an electronic device, disable hardware write locking of at least a first, second, and third region of a plurality of regions in a non-volatile memory, and execute a first boot code portion from a first region of the plurality of regions to begin a boot procedure;
check, by the executed first boot code portion, whether an update code for the first boot code portion exists;
in response to determining that no update code for the first boot code portion exists, cause, by the executed first boot code portion, hardware write locking of the first region;
after causing the hardware write locking of the first region, validate, by the first code boot portion, a second boot code portion in the second region and validate a redundant version of the second boot code portion in the third region; and
in response to validating the second boot code portion and the redundant version of the second boot code portion;
cause hardware write locking of the second region and the third region;
select randomly the second boot code portion or the redundant version of the second boot code portion; and
execute the randomly selected second boot code portion or redundant version of the second boot code portion.

17. The non-transitory machine-readable storage medium of claim 16, wherein validating the second boot code portion in the second region and validating the redundant version of the second boot code portion in the third region comprises verifying an integrity of the second boot code portion in the second region or verifying an integrity of the redundant version of the second boot code portion in the third region.

18. The non-transitory machine-readable storage medium of claim 16, wherein the instructions upon execution cause the electronic device further to:

check whether a further update code for the second boot code portion exists in an update writeable region for the second boot code portion;

in response to determining that the further update code exists in the update writeable region for the second boot code portion, updating, by the executed first boot code portion using the further update code, the second boot code portion in the second region.

19. The non-transitory machine-readable storage medium of claim 16, wherein the third region of the non-volatile memory comprises a redundant region of the non-volatile memory which stores the redundant version of the second boot code portion, and wherein the instructions upon execution cause the electronic device further to:

check an integrity of the redundant version of the second boot code portion in the redundant region; and in response to detecting an invalid second boot code portion in one of the second region and the redundant region, replace the invalid second boot code portion with a valid second boot code portion in another one of the second region and the redundant region.

20. The non-transitory machine-readable storage medium of claim 16, wherein the instructions upon execution cause the electronic device further to:

in response to detecting that both the second boot code portion in the second region and redundant version of the second boot code portion of the redundant region are invalid, indicate an error.

\* \* \* \* \*